United States Patent [19]

Beauducel

[11] Patent Number: 5,204,843
[45] Date of Patent: Apr. 20, 1993

[54] INTEGRATED RECEPTION SYSTEM OF GREAT LENGTH FOR SENSING ACOUSTIC WAVES

[75] Inventor: Claude Beauducel, Henonville, France

[73] Assignee: Institut Francais du Petrole, Rueil-Malmaison, France

[21] Appl. No.: 723,181

[22] Filed: Jun. 28, 1991

[30] Foreign Application Priority Data

Jun. 29, 1990 [FR] France ............................. 90 08269

[51] Int. Cl.$^5$ ............................................. G01V 1/38
[52] U.S. Cl. ...................................... 367/20; 367/154; 367/159; 310/337; 310/800; 29/594; 114/244
[58] Field of Search ............ 367/15, 20, 154, 159, 367/169; 114/242, 244, 253; 29/594; 310/337, 800

[56] References Cited

U.S. PATENT DOCUMENTS

| | | | |
|---|---|---|---|
| 3,371,311 | 2/1968 | Cholet et al. | 367/154 |
| 3,372,370 | 3/1968 | Cyr | 367/162 |
| 3,713,085 | 1/1973 | Laurent et al. | 367/120 |
| 3,763,464 | 10/1973 | Laurent | 367/157 |
| 3,775,737 | 11/1973 | Laurent | 367/20 |
| 4,398,271 | 8/1983 | Cretin et al. | 367/20 |
| 4,486,869 | 12/1984 | Carter | 367/154 |
| 4,491,939 | 1/1985 | Carpenter | 367/20 |
| 4,510,588 | 4/1985 | Kruka et al. | 367/154 |
| 4,755,708 | 7/1988 | Granz et al. | 310/337 |
| 4,768,173 | 8/1988 | Gautier et al. | 367/15 |
| 4,787,069 | 11/1988 | Beauducel et al. | 367/21 |
| 4,805,157 | 2/1989 | Ricketts | 367/119 |
| 4,810,913 | 3/1989 | Beauducel et al. | 367/165 |
| 4,918,666 | 4/1990 | Beauducel et al. | 367/15 |
| 4,979,966 | 12/1990 | Rojey et al. | 55/32 |
| 4,984,222 | 1/1991 | Beauducel et al. | 367/159 |
| 4,996,675 | 2/1991 | Beauducel | 367/162 |

OTHER PUBLICATIONS

*Hackh's Chemical Dictionary*, Fourth Edition, McGraw-Hill Book Company, p. 657, definition of "syntactic".

Primary Examiner—J. Woodrow Eldred
Attorney, Agent, or Firm—Antonelli, Terry, Stout & Kraus

[57] ABSTRACT

A reception system including a central core (5) formed of a traction cable (6) and a harness (7) of conducting wires. A fibrous or porous acoustic screen (8) made, for example, from a fibrous or porous material is formed around the core. Sensitive elements are arranged outside this screen, with discontinuous inner electrodes (9) connected to the different wires of the central harness (7), and a common outer electrode (13). A pipe made of a piezoelectric material (12) is formed therebetween. The whole is covered with a protective sheath (2). With such a multi-layered sensitive structure, the manufacturing process of the reception system can be simplified.

17 Claims, 1 Drawing Sheet

INTEGRATED RECEPTION SYSTEM OF GREAT LENGTH FOR SENSING ACOUSTIC WAVES

BACKGROUND OF THE INVENTION

The present invention relates to an integrated reception system of great length, for sensing acoustic waves, with sensitive piezoelectric elements distributed along its length, and to a process for manufacturing such a reception system.

The reception system according to the invention finds use, for example, in the field of oceanography or of marine seismic prospecting.

Acoustic reception systems such as those used in marine seismic prospecting, for example, often comprise a very large number of seismic sensing units, such as hydrophones for example, which are distributed at regular intervals all along a supple sheath of very great length or seismic streamer, set up by interconnecting a plurality of sections. The seismic streamer is towed behind a ship moving along path over which the seismic profiling is to be explored, and successive cycles of emission of acoustic signals and of reception of the signals reflected by the subsoil discontinuities in response to the emitted signals are achieved. In modern seismic streamers, the signals picked up by the seismic sensors during each cycle are collected by acquisition devices arranged in housings inserted between the successive streamer sections, sampled, digitized, and stored. The different acquisition devices are connected by common transmission channels, laid all along the streamer, with a central recording laboratory located on the ship. One or several channels are used for transmitting coded orders addressed to the different devices by the central laboratory on the ship.

One or several channels are used for transmitting towards the laboratory the signals emitted by the different devices in response to the received orders. At the end of each emission-reception cycle, the different acquisition devices receive orders to sequentially transmit to the laboratory the data they have stored. Such seismic streamers are, for example, described in U.S. Pat. Nos. 4,398,271 and 4,787,069 and in French Patent Applications FR, 2,653,898 and 2,654,220, all assigned to the same assignee as the present invention.

The sensors arranged along the seismic streamers can be, for example, piezoelectric transducers generally comprising one or several sensitive elements interconnected in series and/or in parallel, each one consisting of a substrate having piezoelectric properties and two electrodes or armatures arranged on either side. The substrate can, for example, be provided in the form of disks made of fritted ceramic with relatively small sizes, included in a rigid housing provided with one or several faces transparent to acoustic waves. The housing is filled with air or with a damping material which absorbs acoustic waves and which can withstand without any distortion considerable variations in the hydrostatic pressure exerted externally on the housings. Such sensors are described, for example, in U.S. Pat. Nos. 3,763,464 and 4,996,675, both assigned to the same assignee as the present invention.

Acoustic sensors of relatively great length without rigid housings are also well-known. They can be sensitive elements of tubular form, such as those described in U.S. Pat. Nos. 3,371,311 and 3,775,737, both assigned to the same assignee as the present invention.

They may also be sensitive elements in the form of supple bands made from materials which are given piezoelectric properties by a treatment. Materials such as PVDF (polyvinylidene fluoride), polyethylene, PTFE (polytetrafluoroethylene), etc, are for example used, or else copolymers which have the property of crystallyzing directly in a polarizable form.

Such sensitive piezoelectric elements are, for example, described in the U.S. Pat. Nos. 4,768,173, 4,810,913, 4,918,666 and 4,984,222, all assigned to the same assignee as the present invention.

Whatever the type of the sensor may be, achieving a reception system suitable for seismic prospecting, for example, is generally very complex. This is due to the large number of sensors to be arranged all along and in the space delimited by the outer protective sheath, as well as to the very large number of electric connections to be carried out in order to connect through conducting wires the different sensors either directly to the recording laboratory or by means of the acquisition devices which are most often inserted between the successive sections of the reception system.

SUMMARY OF THE INVENTION

The integrated reception system of great length for sensing acoustic waves according to the invention make it possible to simplify the complex manufacturing and connecting operations and to decrease the failure risks because of its design and because of the technology used.

The system comprises a plurality of piezo-electric acoustic sensors, each one consisting of a piezoelectric sensitive element associated with a first electrode and a second electrode, a common supporting central core which is continuous and which includes at least one traction cable and a harness of conducting wires coated in a volume of a damping material to form an acoustic screen, the acoustic sensors being arranged around and along the supporting central core, a first electrode of each one of the different acoustic sensors being connected with the corresponding electrodes of the other acoustic sensors, and the second electrode of each acoustic sensor being connected with one of the conducting wires of the supporting central core through the material constituting the acoustic screen.

The reception system according to the invention can comprise a continuous conducting film forming an electrode common to all the acoustic sensors.

The material constituting the acoustic screen can be a fibrous material, a porous material with open cells, a syntactic substance etc, as the case may be.

The first electrode of each acoustic sensor can be, for example, a conducting film externally covering the material constituting the acoustic screen.

Each piezoelectric sensitive element is provided, for example, in the form of a pipe made of a sensitive substrate associated with electrodes on its inner face and its outer face.

Each piezoelectric sensitive element can also comprise a flexible band provided with electrodes on its opposite faces, each acoustic sensor comprising at least one sensitive element helically wound around the volume of the material constituting the acoustic screen.

The process according to the invention makes it possible to greatly simplify the providing of an integrated system of great length for the reception of acoustic waves. It comprises:

gathering at least one traction cable and a harness of conducting wires of great length;

incorporating said traction cable and said harness on their total length into a volume of a damping material constituting an acoustic screen for the acoustic waves;

setting piezoelectric acoustic sensors around said volume constituting the acoustic screen; and sheathing the whole constituted thereby into a protective covering transparent to acoustic waves.

The setting of the piezoelectric acoustic sensors advantageously comprises:

constituting, on the outer surface of the volume forming the acoustic screen, discontinuous conducting films with a length adapted to those of the acoustic sensors to be formed, and respectively connecting them to conducting wires of the harness;

achieving discontinuous piezoelectric sensitive layers with a length adapted to that of the discontinuous conducting films constituted previously; and positioning above said sensitive layers a continuous conducting film constituting an electrode common to all the acoustic sensors.

According to an embodiment of the procedure, the piezoelectric sensitive layers are obtained through the extrusion of a substrate, and this substrate can be polarized after depositing on the discontinuous conducting films.

According to an embodiment of the procedure, constituting the discontinuous conducting films and the continuous conducting film is achieved by vaporization.

According to another embodiment of the procedure, constituting the discontinuous conducting films and the continuous conducting film is achieved by deposition of a conducting film.

Since the system according to the invention is set up by successively integrating constituents (piling or successive depositions) from a central core, it can be manufactured by means of a simpler and more rational process.

BRIEF DESCRIPTION OF THE DRAWINGS

Other features and advantages of the process and of the device according to the invention will be clear from reading the description hereafter of an embodiment procedure given by way of non limitative example, with reference to the accompanying drawings in which.

DESCRIPTION OF THE PREFERRED EMBODIMENTS

Figure 1:
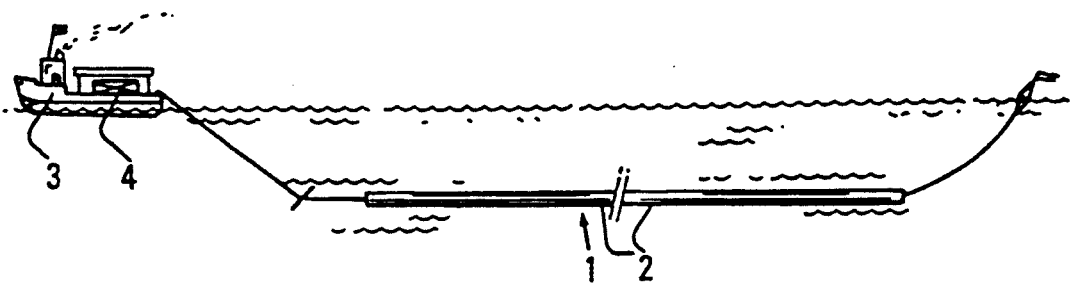
FIG. 1 is a diagrammatic view showing a system for the reception of acoustic waves in an application to marine seismic prospecting, for example.

The reception system 1 schematized in FIG. 1 can, in an application to marine seismic prospecting, reach a length of several kilometers. It is contained in a tight sheath 2 towed in immersion by a ship 3 provided with a control and recording laboratory 4 adapted for collecting and recording in digitized form the total signals picked up by acoustic sensors, in this case hydrophones and/or accelerometers, distributed along the reception system. The latter can be all in one piece or consist of a plurality of sections interconnected with one another by interconnecting boxes containing electronic acquisition devices adapted for collecting all the signals picked up by the sensors distributed along at least one of the sections connected by the box, as described for example in the U.S. Pat. Nos. 4,398,271 and in French Patents 2,653,898 and 2,654,220 cited above.

Figure 2:
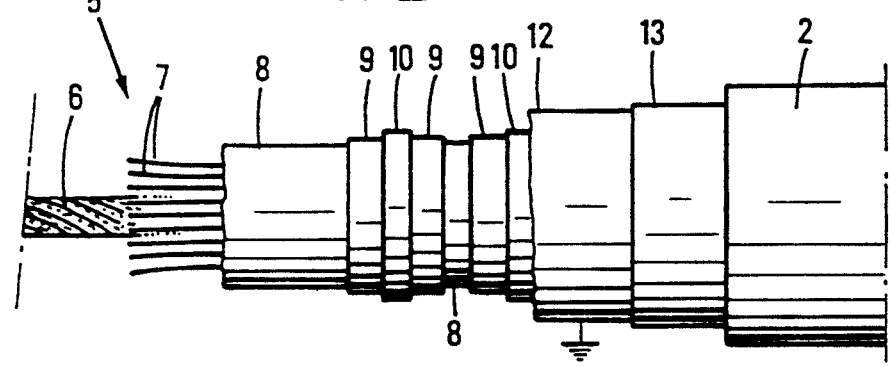
FIG. 2 diagrammatically shows the superposition of the different layers constituting the system according to the invention.
Figure 3:
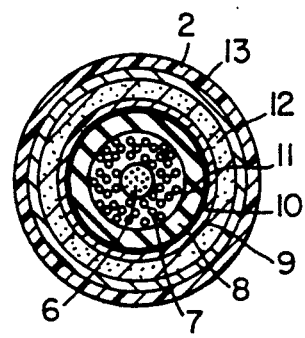
FIG. 3 diagrammatically shows a cross section of the same embodiment of the system according to the invention.

The reception system according to the invention or, as the case may be, each one of the sections constituting it, comprises, as shown in FIG. 2 and 3, a superposition of elements arranged coaxially. A core 5, consisting of a cable 6, capable of withstanding the towing stresses, and of a harness 7 of conducting wires, is arranged in the centre. Core 5 is incorporated into a damping of a material absorbing acoustic waves which constitutes an acoustic screen 8. As already described in U.S. Pat. No. 4,918,666, the acoustic screen 8 can for example consist of a fibrous structure or a porous structure with open cells impregnated with a liquid, or else of a syntactic material comprising for example small solid particles such as hollow balls embedded in a coating material such as epoxy resin, this list being non limitative.

Conducting electrodes 9 are arranged on the outer face and along this tubular acoustic screen 8. These electrodes 9 can be formed by plating the acoustic screen 8 with a metallic strip, for example made of copper, or by depositing a film of a conducting material. The film can be obtained by any well-known method, for example by vacuum spraying or by depositing a metallic paint. The length of these electrodes 9 and/or the space left between them along the acoustic screen 8 may vary within notable proportions according to the size of the sensors to be constituted.

Each electrode 9 is in contact with a contact block or a conducting ring 10 connected with a conducting wire of the wire harness 7 laid along the core through a conducting connection 11.

A piezoelectric sensitive layer 12 is formed around the electrodes 9. This sensitive layer can be formed by extrusion from a plastic synthetic material such as PVDF, polyethylene, PTFE, etc, which is given piezoelectric properties. The material can be presensitized before its extrusion or once it is shaped on the electrodes 9, following a well-known method.

A continuous electrode 13 is formed above the sensitive layer over the total length of the reception system or of the constructed portion, and it is grounded. This continuous outer electrode 13 can also be formed by vacuum metallizing. Each acoustic sensor therefore consists of a portion of a tubular sensitive element 12 between each inner electrode 9 and a portion of an outer electrode 13 of equivalent length.

The whole constituted therewith is then covered with the outer sealing sheath 2.

The wires of harness 7 connected with the inner electrodes of the different acoustic sensors are directly linked to the inputs of an acquisition system in laboratory 4. In the most common case where the reception system is divided in several sections, the different conducting wires of harness 7 connected with the sensors of the same section are also connected with the inputs of a local acquisition box (not shown) adapted for multiplexing, amplifying, and digitizing the received signals and transmitting them to the central laboratory in coded form, as described for example in U.S. Pat. No. 4,398,271. In this case, harness 7 comprises local linking wires between the sensors and the inputs of a neighbouring acquisition box, general transmission lines linking the different acquisition boxes to the central laboratory 4 and power supply lines for the electronic arrays distributed along the reception system.

Superposing the components of the system allows the application of a sequential manufacturing process.

The carriage ropes 6 and the harness 7 of wires being grouped together well, the acoustic screen 8 is formed around them by means of an extrusion machine, for example;

the discontinuous inner electrodes 9 are arranged on the outer wall of the screen by spraying or by deposition of conducting substances, and they are connected thereafter through wires 11 with different conducting wires of harness 7;

a layer of a piezoelectric substrate 12 is formed thereon, notably by extrusion, and it can be presensitized already; in the opposite case, the substrate can be passed into a sensitivation device of a well-known type after its forming;

the continuous outer electrode is arranged by deposition of conducting substances or by vacuum metallization;

the whole can then be embedded into a protective sheath 2, for example made of elastomer.

In the embodiment procedure which has been described, the acoustic sensors are given a tubular shape. This type of sensor could, nevertheless, be replaced with those described, for example, in U.S. Pat. No. 4,768,173 without departing from the scope of this invention. The sensitive elements comprise in this case a piezoelectric supple strip provided with electrodes helically wound around the acoustic screen 8, or two superposed supple strips helically wound in the opposite direction on the same acoustic screen. Conducting rings are put in contact with the outer electrodes and interconnected in order to form the common electrode. Other conducting rings are put in contact with the inner electrodes and connected with the conducting wires of harness 7. If this type of embodiment procedure is selected, it can also be integrated into the sequential manufacturing procedure described above.

I claim:

1. An elongated, integrated system for reception of acoustic waves, comprising:
   an elongated continuous supporting core cable including a plurality of continuous electrically conducting wires for electrically connecting the reception system to a data acquisition system;
   an elongated acoustic screen member surrounding said core cable over the length thereof;
   an elongated continuous piezoelectric layer surrounding said screen member over the length thereof;
   an elongated continuous first electrode member positioned on a first side of said piezoelectric layer; and
   a plurality of discrete second electrode members positioned at spaced intervals along said piezoelectric layer on a second side of said layer, each second electrode member including means electrically connecting such second electrode member to an associated one of said conducting wires, each second electrode member cooperating with a portion of said piezoelectric layer contacting such second electrode member and with a portion of said first electrode member contacting such portion of said piezoelectric layer to cause such portion of said piezoelectric layer to serve as a distinct piezoelectric acoustic sensor element.

2. A system as claimed in claim 1, wherein said first electrode means comprises a conductive film that is common to all the acoustic sensors.

3. A system as claimed in claim 2 or 1, wherein said acoustic screen comprises a plurality of fibers.

4. A system as claimed in claim 2 or 1, wherein said acoustic screen comprises a porous damping material with open cells.

5. A system as claimed in claim 2 or 1, wherein said acoustic screen comprises a syntactic substance.

6. A system as claimed in claim 1 wherein each second electrode member comprises a conducting film on the exterior of said acoustic screen.

7. A system as claimed in claim 2 or 1, wherein each piezoelectric acoustic sensitive element comprises a sensitive substrate material having said first and second electrodes on its outer face and its inner face, respectively.

8. A system as claimed in claim 2 or 1, wherein each piezoelectric acoustic sensitive element comprises a supple band having said first and second electrodes on opposite faces thereof, and helically wound around said acoustic screen.

9. A process for forming an elongated integrated system for the reception of acoustic waves, comprising the steps of
   (a) enclosing at least one tractor cable within a harness of elongated continuous electrically conducting wires;
   (b) incorporating the traction cable and the harness within an acoustic screen;
   (c) positioning first electrode-forming means on the acoustic screen;
   (d) positioning a piezoelectric layer around the first electrode forming means;
   (e) positioning second electrode-forming means on the piezoelectric layer, one of the first electrode-forming means and the second electrode-forming means forming discrete electrode members positioned at spaced intervals along the piezoelectric layer and including means connecting each discrete electrode member to an associated one of the conducting wires, each discrete electrode member cooperating with a portion of the piezoelectric layer contacting such electrode member and with a portion of the other electrode-forming means contacting such portion of the piezoelectric layer to cause such portion of the piezoelectric layer to serve as a distinct piezoelectric acoustic sensor element; and
   (f) sheathing the system in a protective covering transparent to acoustic waves.

10. A process as claimed in claim 9 wherein steps (c), (d) and (e) comprise:
   providing on the outer surface of the acoustic screen a plurality of discontinuous conducting films;
   connecting each conducting film with a respective one of the conducting wires of the harness;
   providing a piezoelectric sensitive layer over the discontinuous conducting films; and
   providing over the piezoelectric sensitive layer a continuous conducting film forming an electrode common to all the acoustic sensors.

11. A process as claimed in claim 10 wherein the piezoelectric sensitive layer is formed by extrusion of a continuous substrate.

12. A process as claimed in claim 11 wherein the substrate is polarized after its extrusion.

13. A process as claimed in any one of claims 10 to 12 wherein the providing of the discontinuous conducting films and of the continuous conducting film is achieved by vaporization.

14. A process as claimed in any one of claims 10 to 12 wherein the providing of the discontinuous conducting films and of the continuous film is achieved by the depositing of a conducting substance.

15. A system as claimed in claim 1, wherein said elongated supporting cable further includes a traction cable, and wherein said electrically conducting wires are in a harness around said traction cable.

16. A system as claimed in claim 1, wherein said first electrode member comprises a conducting film on the exterior of said piezoelectric layer.

17. A system as claimed in claim 1, further comprising an outer sealing sheath member enclosing said system.

* * * * *